Figure 1:
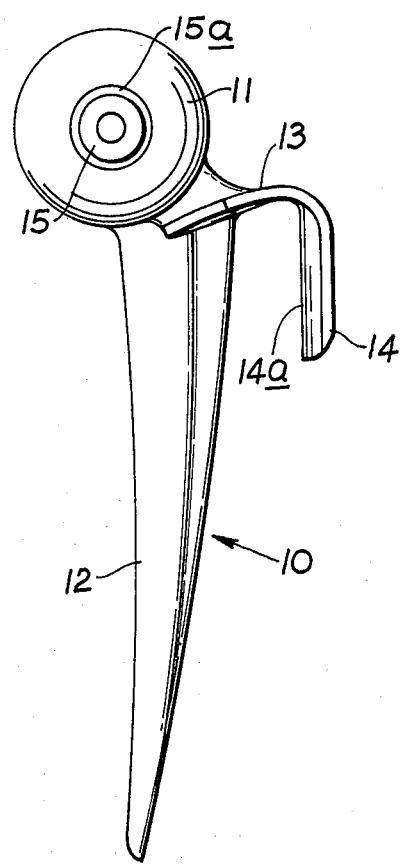

United States Patent [19]

Findlay

[11] 3,886,601

[45] June 3, 1975

[54] PROSTHETIC KNEE JOINT ASSEMBLY

[76] Inventor: Eric George Findlay, 66 Barley Ln., Kingsthorpe, England

[22] Filed: Sept. 9, 1974

[21] Appl. No.: 504,123

Related U.S. Application Data

[63] Continuation of Ser. No. 347,461, April 3, 1973, abandoned.

[30] Foreign Application Priority Data

Mar. 4, 1972    England...................... 10207/72

[52] U.S. Cl............................ 3/1; 128/92 C; 46/173
[51] Int. Cl. .............................................. A61f 1/24
[58] Field of Search.... 3/1; 128/92 C, 92 CA, 92 R; 46/161, 173

[56] References Cited
UNITED STATES PATENTS

| | | | |
|---|---|---|---|
| 3,506,982 | 4/1970 | Steffee......................................... | 3/1 |
| 3,688,316 | 9/1972 | Lagrange et al. ............. | 128/92 C X |
| 3,696,446 | 10/1972 | Bousquet et al............................ | 3/1 |
| 3,760,427 | 9/1973 | Schultz.......................... | 128/92 C X |
| 3,805,302 | 4/1974 | Mathys...................................... | 3/1 |

FOREIGN PATENTS OR APPLICATIONS 1,047,640    7/1953    France............................ 128/92 C Primary Examiner—Ronald L. Frinks
Attorney, Agent, or Firm—Norris & Bateman

[57] ABSTRACT

A prosthetic limb joint consisting of two joint members adapted for connection to respective bones such as a femur and a tibia, one member being formed with a spherical ball end having opposed cylindrical trunnions and the other member being formed with a spherical socket that extends over more than 180° and has a rim provided with cut-out recesses to receive the opposed trunnions defining an open end that is sufficiently resilient to receive the ball with snap-engagement during assembly and hold it in the socket during flexing of the joint.

7 Claims, 6 Drawing Figures

PROSTHETIC KNEE JOINT ASSEMBLY

This is a continuation of application Ser. No. 347,461 filed Apr. 3, 1973, and now abandoned.

This invention relates to artificial joints intended to be installed by surgery, particularly for the human body. The invention has particular but not exclusive application in the provision of a prosthetic knee joint.

One problem with existing prosthetic limb joints is that due to the weight of the lower limb it has been necessary to provide a bolt or positive coupling through the joint to take such loads and prevent bearing faces of the joint members (which absorb compressive loads) from becoming dislocated. The presence of such bolt or coupling often tends to produce metallic particles or dust (from the metal component or components of the joint) which may create complications.

The object of the present invention is to provide an improved artificial joint which resists dislocation but without using a bolt or the like.

According to the invention a prosthetic joint assembly comprises first and second joint members adapted to be rigidly attached to respective bones to be interconnected by the joint, wherein a ball on the first member locates in a socket of the second member which socket extends over more than 180° of arc so as to resist dislocation of the joint following snap-engagement of the ball in the socket.

Figure 2:
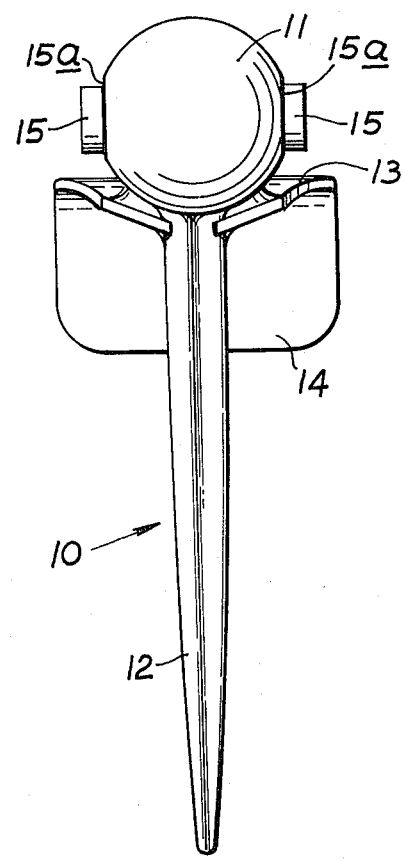
Figure 3:
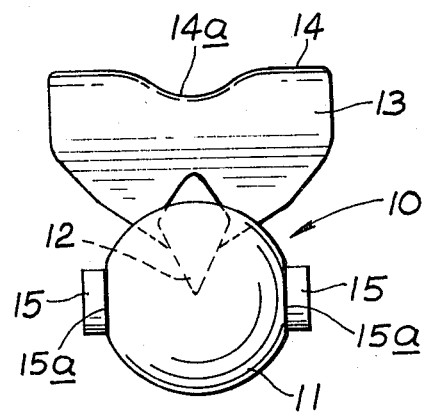
Figure 4:
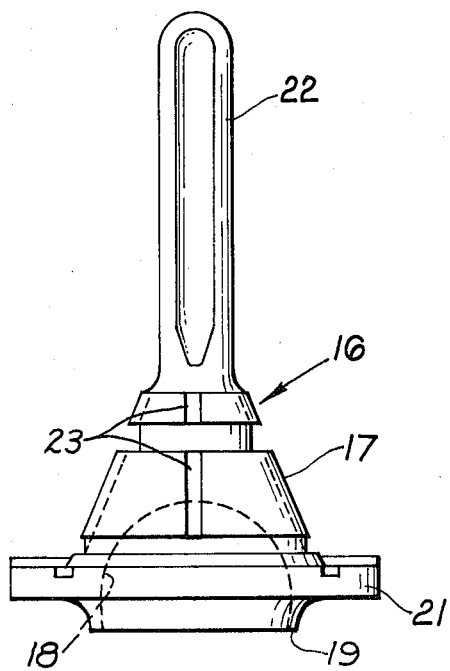
Figure 6:
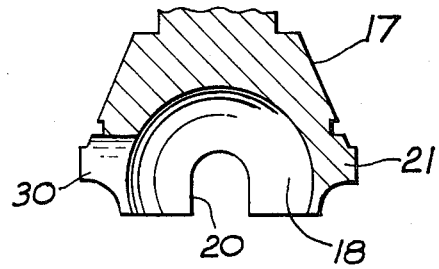
Figure 5:
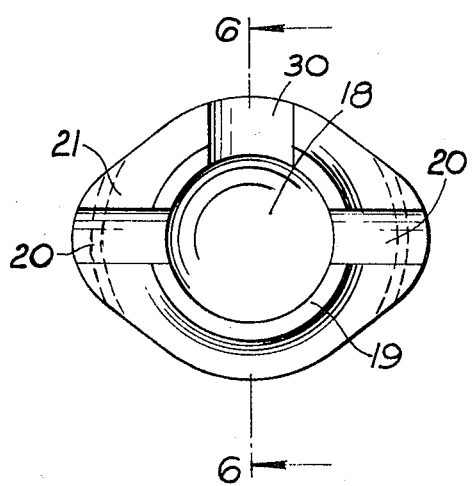

A preferred embodiment of the invention, in the form of a prosthetic knee joint, is now more particularly described with reference to the accompanying drawings wherein:

FIG. 1 is a side view of a first member of the joint;
FIG. 2 is a rear view of said member;
FIG. 3 is an end view of said member;
FIG. 4 is a side view of a second member of the joint;
FIG. 5 is an end view of a socket portion of the second member; and
FIG. 6 is a sectional view on line 6—6 of FIG. 5.

A first member 10 of the prosthetic knee joint (FIGS. 1 to 3) is formed from metal e.g., titanium, a cobalt/chromium/molybdenum alloy, or stainless steel, and includes at an upper end (as viewed in the drawings) an integral ball 11. A curved spike 12 extends from the ball offset somewhat towards the front of the member, and an integral platform 13 extends laterally forward from the junction between the spike and ball and terminates in a downwardly extending front shield 14 parallel to but spaced from an upper front part of spike 12.

In use member 10 is fixed to the lower end of the femur by axial insertion of spike 12 into the bone until platform 13 abuts a prepared end face thereof, shield 14 locating behind the patella. Shield 14 has an inwardly dished central zone 14a (FIG. 3) to better accommodate the patella and its associated ligaments etc. A pair of diametrally extending cylindrical trunnions 15 project from opposite sides of ball 11 on a lateral axis parallel to the plane of shield 14.

Trunnions 15 may be formed integrally with ball 11 as cylindrical projections therefrom. However, as this may give rise to manufacturing difficulties associated with the spherical forming and polishing of ball 11, an alternative construction is for ball 11 to be formed with a transverse bore extending between parallel planar side faces 15a. After finishing of the ball a transverse pin is secured whose end parts form the trunnions 15, for example a pin having a cylindrical head forming one trunnion may be secured by the attachment of a cylindrical nut or the like forming the other trunnion.

A second member 16 of the joint (FIGS. 4 to 6) is formed from a synthetic plastics material, e.g., high density polyethylene or polyester, having a degree of resilience; and includes at a lower end (as viewed in the drawings) a frusto-conical part 17 whose greater diameter end defines a downwardly open spherical concave socket 18 extending over somewhat more than 180° of arc and complementary in shape to ball 11, the rim 19 of socket 18 is lying in a plane normal to the longitudinal axis of the member. Said rim 19 is sufficiently resilient to allow ball 11 to be forced into snap-engagement in socket 18 while resisting subsequent dislocation thereof, so as to form an articulated joint.

Rim 19 defines at opposite sides a pair of U-section recesses 20 with which the pins 15 of ball 11 cooperate so that relative movement of the joint members is restricted to limited lateral rocking and axial twisting while permitting a large degree of angular hinging movement about a lateral axis. In order to increase the degree of the latter movement rim 19 defines a further cut-out 30 for accommodating part of spike 12 of member 10, e.g., to enable the knee to take up a kneeling position.

Member 16 further includes an integral annular oval flange 21 on a plane including the centre of curvature of socket 18 and intersected by recesses 20 and cut-out 30; and a fluted shank 22 extending axially from the lesser diameter end of frusto-conical part 17. Shank 22 is cut to the required length and inserted into the tibia so that flange 21 abuts a prepared end face thereof. In some cases shank 22 may be removed entirely or not provided, but the fluted or other non-circular section of the shank 22 facilitates keying into the bone structure either as a result of natural growth or by the use of a cement during the installation operation. Flange 21 and the periphery of part 17 have keying grooves 23 which permit flow of excess cement during installation and improve the bond between the bone structure and member 16. It will be appreciated that the shaping of part 17, shank 22, and the spike 12, platform 13 and shield 14 of member 10 can be widely varied according to the type of patient to be treated and the bone condition.

While the above embodiment takes the form of a knee joint having a socket member 17 provided with a shank 22 for attachment to the tibia, and a metal ball member 10 provided with a spike for insertion in the femur it is contemplated that other forms of joint incorporating the invention might have a spike portion for attachment to an upper limb (e.g., the femur) and a shank part with or without a tapered portion for attachment to a lower limb, (e.g., either the tibia or the femur), or that other forms of attachment might be employed.

The absence of any bolt or coupling pin serving to interconnect the joint members in the manner of a hinge provides smoother and more efficient joint action without danger of producing metal particles or dust within the joint, yet the snap-engagement of the ball and socket serves to support the weight of the lower limb and resist dislocation. The form of joint described above may lead to a reduction in weight as compared with some known types of prosthetic joint.

Trunnion pins 15 and cooperating pockets 20 may be unnecessary in some applications, or a single pin only may be needed to restrict angular movement in one direction only.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A prosthetic knee joint assembly comprising first and second joint members respectively formed to be rigidly attached to the femur and tibia to be interconnected by the joint, wherein a ball on the first member is adapted to fit for rocking movement within a socket of the second member which socket extends over more than 180° of arc with respect to the axis of rocking so as to support the suspended weight of the lower leg and resist dislocation of the joint following snap-engagement of the ball in the socket for bearing compressive forces acting on the joint and there being a pair of diametrally extending cylindrical trunnions projecting on opposite sides of the ball on a common lateral axis thereof to be received in corresponding recesses in a rim of the socket for limiting relative angular movement between the members in two opposite directions, said recesses consisting of cut-outs in said rim breaking the continuity of said socket so as to permit escape of fluid from the socket as said snap-engagement takes place.

2. An assembly according to claim 1, wherein the first member is a metal component and the second member is formed from synthetic plastics material sufficiently resilient to permit said snap-engagement.

3. An assembly according to claim 2 wherein said synthetic plastics material is of high density polyethylene.

4. An assembly according to claim 1, wherein the member adapted to be fixed to the femur includes a front shield for location behind the patella.

5. An assembly according to claim 1, wherein said joint members each comprise a flange for abutment with the prepared end of the associated bone.

6. An assembly according to claim 1, wherein said joint members each comprise a spike for axial insertion into an end part of the associated bone.

7. An assembly according to claim 6, wherein at least one of said spikes is grooved.

* * * * *